Aug. 7, 1928.
W. F. OBERHUBER
1,679,779
VALVE AND FLANGED SEAL
Filed April 8, 1926   2 Sheets-Sheet 1
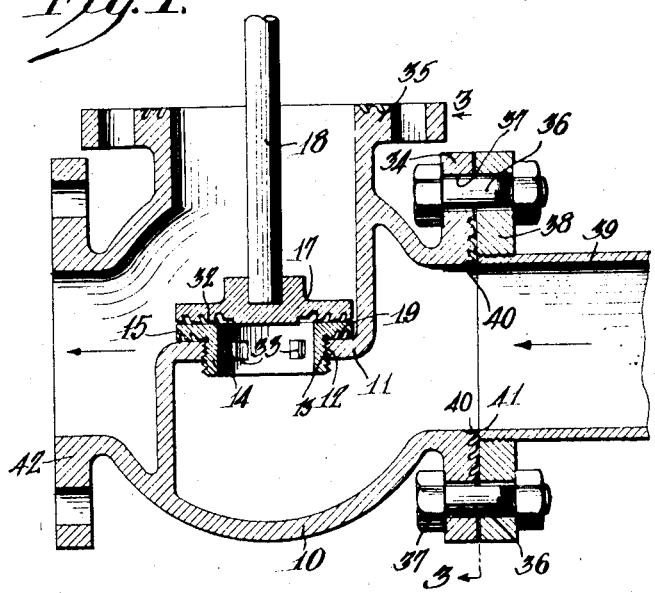
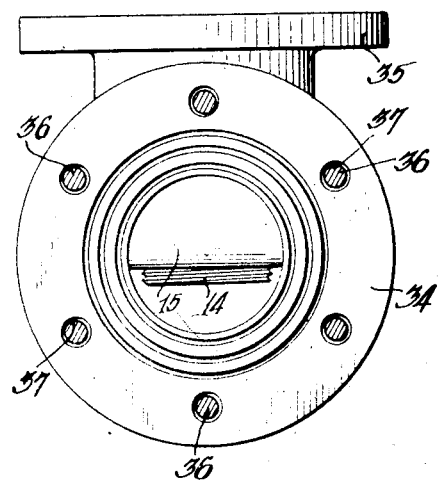
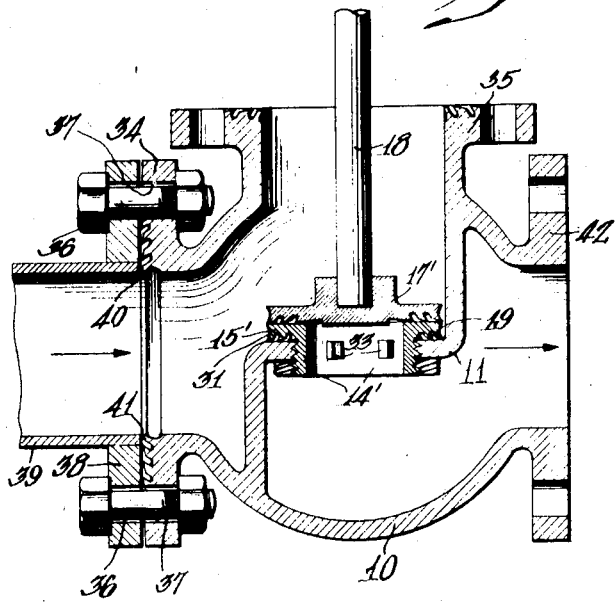
Inventor
William F. Oberhuber
by
Attorney
Witness:

Aug. 7, 1928.
W. F. OBERHUBER
1,679,779
VALVE AND FLANGED SEAL
Filed April 8, 1926    2 Sheets-Sheet 2
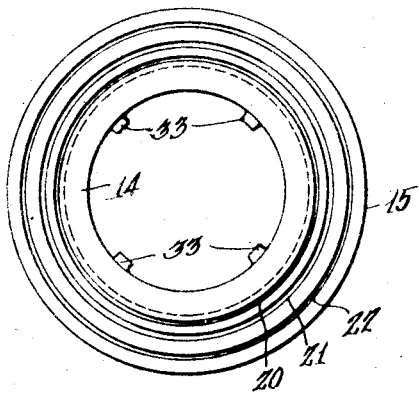
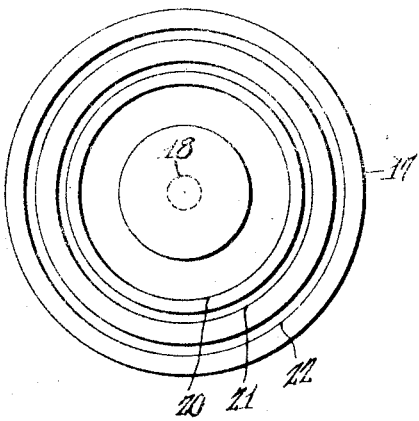
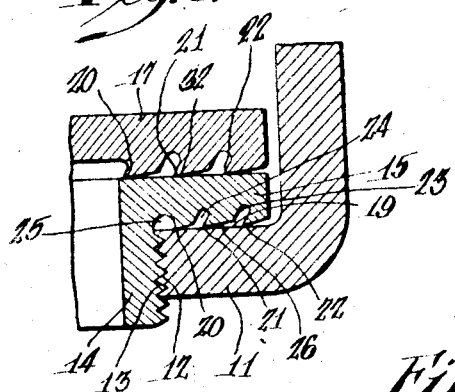
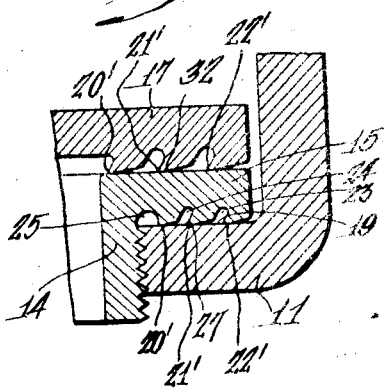
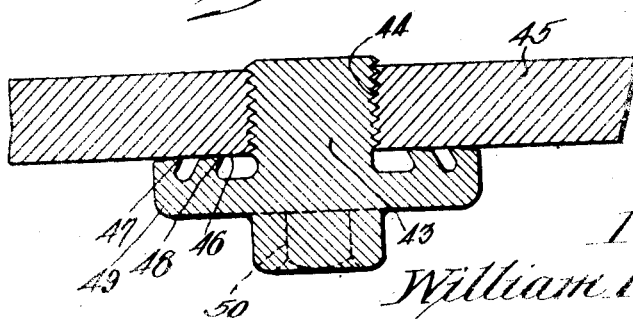
Inventor
William F. Oberhuber
by Wm Steel Jackson
Attorney
Witness:

Patented Aug. 7, 1928.

1,679,779

UNITED STATES PATENT OFFICE.

WILLIAM F. OBERHUBER, OF LANSDOWNE, PENNSYLVANIA.

VALVE AND FLANGED SEAL.

Application filed April 8, 1926. Serial No. 100,560.

My invention relates to seals for flanges and for valve members.

One of the purposes of my invention is to seal by annular spring contacts between a flange attached to a plug or sleeve and the face of the wall into which the plug or sleeve is threaded, tightening the spring contacts preferably by the thread into engagement with the wall.

A further purpose is to provide undercut annular contacts upon a flange and to hold the flange in position against a wall by threaded means.

A further purpose is to provide a range of resilient contact sufficient to permit further tightening by temperature contraction of the parts and to retain contact with expansion of the parts due to heat.

A further purpose is to provide annular spring contacts, preferably undercut, between a movable element and the seat with which that element is intended to engage.

A further purpose is to seal between a flange or movable valve element and the wall or seat by a plurality of spaced spring contacts, each reducing the pressure available against the next in case of leakage.

Further purposes will appear in the specification and in the claims.

I have preferred to illustrate my invention by one main form only, appearing in several modifications. I have selected a form which has proved to be practical, efficient, reliable and inexpensive and which at the same time well illustrates the principles of my invention.

Figures 1 and 2 are longitudinal sections through globe valves and connected structure, showing slightly different applications of the same form of the invention.

Figure 3 is a section of Figure 1 taken upon line 3—3.

Figures 4 and 5 are bottom plan views of a movable valve element and of a flanged sleeve, respectively, such as shown in Figure 1.

Figures 6 and 7 are fragmentary enlarged sections corresponding generally with parts of Figure 1, but showing slightly variant spring contact detail.

Figures 8 and 9 are fragmentary longitudinal sections corresponding generally with parts of Figure 2 but showing slightly variant annular contact detail.

Figure 10 is a central longitudinal section showing a plug sealed by my invention.

In the drawings similar numerals indicate like parts.

In the formation of plugs, of annular rims and seats such as are used as facings about valve openings and in valves to cooperate with these facings, it has been difficult properly to seal between the plug, rim, seat or valve and the metal into which it is secured or with which it cooperates. As a consequence, particularly in high pressure constructions and where a liquid is hard to hold, it has been necessary to form the seat in the structure of the valve itself or to close an opening at considerable expense of packing and construction to hold the packing. Metallic valves have relied upon an exactness of meeting faces and pressure which it has been possible to maintain upon them to hold the valve tight, leading to excessive pressures of the valve against its seat. The excessive pressures have caused valve and valve seat scoring and deformation which are serious even when slight. My invention has been directed to relieve these conditions.

In Figures 1 and 2 my invention is applied to valve 10 in which the fluid pressure is intended to flow in the directions of the arrow, upwardly through the valve opening in Figure 1 and downwardly through the opening in Figure 2.

The valve diaphragm or division plate 11 is threaded at 12 to receive the thread 13 of a valve seat 14 or 14' having a flange 15 or 15'. The movable valve member 17 is conventionally shown as operated by a stem 18 which may be moved in any suitable manner.

As the threads 12 and 13 can not easily be made to hold very high pressure of steam for example, I surface the upper face 19 of the plate or wall 11 and provide my seal between it and the flange 15 or 15' which is held to place by the threads.

This flange is provided upon its under side with narrow spaced concentric annular bearing surfaces herein called teeth by reason of the resemblance of their preferred forms in cross section to the teeth of a file or other cutting implement.

Considering Figure 1, the teeth may be shown as in Figure 6 at 20, 21 and 22 for example sloping downwardly and inwardly and terminating in a sharp edge bearing against the face 19, or may have some slight initial bearing width as in the teeth 20', 21', 22' of Figure 7. In either event they are provided each with one sharp edge and are most desirably undercut. They should be made of spring material such as high carbon steel, Monel metal, vanadium steel, nickel steel or chrome nickel steel, all of which withstand high temperatures. The undercutting gives them additional resilience to maintain tight contact and at the same time permits the pressure of the fluid to increase the pressure of the teeth against the surface 19. It also allows for expansion and contraction.

The teeth 20, 21 and 22 and 20', 21', and 22' are separated by grooves 23 and 24 and an interior groove 25 is shown. The slope 26 from the face of the tooth to the bottom of the groove need not be uniform. I find that this slope may be made quite gradual and have had excellent results with a slope as little as one-hundredth of an inch on a nearly radial distance of $\frac{3}{16}$ of an inch.

With a sharp tooth edge there is not quite so much need for undercutting as where there is a slight flat 27 upon the face of the teeth as in Figure 7. On the other hand the fineness of edge desirable will depend greatly upon the resilience and ultimate strength against breaking down of the metal of the teeth as well as of the metal against which it is pressed.

If the teeth 20, 21 and 22 or 20', 21' and 22' all engage the flange face equally at the start the spring in the flange would result in teeth 20 and 20' making tighter ultimate contact than 21, 21' and the latter making tighter contact than 22, 22'. Some such difference may be desirable in such a form as Figure 1 where the fluid pressure is from the inside outwardly.

By very slightly reducing the extent parallel to the axis of either the teeth or the flange so that from in outward radial planes they slightly diverge, one from the other, any proportion of pressure desired can be secured, lessening the inequality to which reference is made or, with increase of initial divergence, securing equality of pressure or even higher contact pressure upon the outer teeth than upon the inner teeth, as may be desired. The latter condition may particularly be desirable in the form shown in Figure 2 where the pressure is from the outside of the flange inwardly and the outer teeth receive the highest fluid pressure and it may be desirable to have them make firmest contact with the face 19.

In the form shown in Figures 2, 8 and 9 the annular teeth 28, 29 and 30 or 28', 29' and 30' face outwardly because the pressure is from the outside inwardly. The teeth shown in Figures 8 and 9 are otherwise substantially identical with those in Figures 6 and 7 differing only as the reversal of direction of slope necessitates. Grooves 24', 25' correspond very nearly with grooves 24 and 25 but the undercutting where desired of the outer teeth 30 or 30' is obtained preferably by grooving the outer rim of the flange as at 31.

Because the pressure is from the outside of the flange inwardly it may be desirable here that the outer teeth shall press more tightly against the diaphragm face 19 than the inner teeth, giving progressively less pressure against each inner tooth. As the same condition is true of this flange and diaphragm as of the flange and diaphragm in Figure 1, relative convergence of the flange face outwardly in radial planes can be used to give this initial and firmest contact and pressure of the outer teeth with lesser contact pressure inside. However, here also any proportion or relation may be secured which is desired as in Figures 1, 6 and 7 up to the limits of resilience or elasticity of the flanges and teeth, giving equality of pressure or greater pressure of any teeth irregularly or progressively as may be desired.

The same conditions determining tooth construction and contact as have been described with respect to the flanges and diaphragms in Figures 1, 6 and 7 on the one hand and in Figures 2, 8 and 9 on the other apply to the teeth upon one of the valve parts, such as the under face of valve 17 in their contact with the other part, in that event valve face 32. One of these parts is finished plain and the other is provided with spaced concentric resilient annular teeth. Here the teeth 20, 21, 22 or 20', 21' and 22' in the form of Figures 1, 6 and 7 and 28, 29, 30 or 28', 29', 30' in the form of Figures 2, 8 and 9 are prefably placed in the movable valve element 17 or 17' and correspond in position and in their operation with the teeth having the same numbers in the flanges 15 and 15' with the same character of preferred undercutting in the valve teeth as in the flange teeth. However, whereas the flange is seated with more or less permanence by securing it to place through wrench engagement with lugs 33, the valve is closed and opened by operation of its stem. In the form of Figure 2 the pressure of the fluid adds to the pressure against the seat.

The same variation of pressure of different teeth may be obtained here as in the other forms, securing increasing pressure progressively from inside out for the form of Figures 1, 6 and 7 or from the outside for the form of Figures 2, 8 and 9, or equality of pressure or a reversal of the above in these figures as called for by the designer. There is also the same capability of undercutting or not as preferred and of varying the slope of the faces 26 and of the sharphess or, alternatively, the extent of flat 27 upon the faces of the teeth in this valve form as with the valve seat flange.

In each of the Figures 1 and 2 two flanges 34 and 35 of the valve body are grooved to form teeth corresponding generally with the teeth of Figures 6 or 7 to cooperate with plain facing flanges of pipes or fittings to make a joint corresponding with the joint shown in Figure 1 between the valve seat flange and the diaphragm but held together by outside instead of inside clamping means. This means is shown in flange 34 as bolts and nuts 36, the bolts passing through openings 37 in the flange 34 and in a flange 38 threaded and welded upon the end of a pipe 39. Here the pipe end is faced off at 40 to form effectively part of the flange face of flange 38 so that the innermost teeth 41 will engage the end of the pipe and by their seal against the pipe will, in part at least, protect the joint between the pipe and flange against fluid pressure. There are four annular teeth shown upon the flange 34 and but three upon the flange 35 as shown. Obviously the number required will vary in different locations and, as in the case of the extra teeth engaging the pipe ends, for special purposes. Flanges 42 as shown are plain.

For the purpose of completing the illustration of the broader claims, in Figure 10 a plug 43 is shown threaded into an opening 44 in a plate 45. The face 46 of this plate is faced for engagement of annular teeth 47, 48, upon flange 49 upon the plug. The teeth here are shown as of the general form shown in Figure 6 but can vary and can have the characteristics and relations to each other and to the face of the plate already pointed out in regard to the other forms shown in Figures 7, 8 and 9. The plug is hexed at 50 to facilitate insertion and can obviously protect against leakage of fluid pressure applied to either side of the plate.

In all of these forms the flange face may slightly diverge one way or another with respect to the engaging surface outlined by the teeth with which it is to engage; and these flanges, therefore, which I have described as plain need, therefore, not be plane. There is another reason for this, that, obviously, variation from the plane toward the conical is permissible provided the two faces cooperate in this.

All of these "joints" operate generally in the same way. In all the teeth are resilient because of the metal from which they are formed and by reason of the undercutting, where this is used. In all they get high pressure per tooth and high contact surface because of the narrowness radially of the line or surface of contact. In all the sharp edge of the tooth on the face toward the pressure causes a sharp cutoff against fluid flow and where there is undercutting adds the pressure of the fluid to the pressure of contact to give additional resilience. In all the flange forms, the teeth are "wiped" into contact and the faces with which they engage are correspondingly cleaned. This is true also of the valve if its stem be turned to seat the valve.

The annulus nearest to the full fluid pressure i. e., the innermost in the seat flange and valve of Figures 1, 6 and 7 and in the flanges of the valve body and the outermost in Figures 2, 8 and 9, will receive the full pressure. Since there will be no leakage past it, or the leakage will be small, there will be little pressure against the second annulus and less against the third and the successive annuli will be subject to progressively lessening pressure.

My invention is very effective even with relatively low actual contact pressure for the reason that any appreciable leakage involves high velocities of flow through and past the successive belts or zones of contact, with consequent high friction losses in pressure at these zones and very high shock losses of the character of so called Carnot-Borda impact losses in each groove. These are measured roughly by the square of the difference in velocity in each groove.

The resilient nature of my joint makes it stand up splendidly even where there is strain tending to tilt the flanges with respect to each other as the range of compression is relatively high and the parts remain still at compression and, therefore, in good contact even when one edge of a flange is strained slightly away from its initial compression position with respect to a cooperating flange.

The additional resilience of high carbon steel, Monel metal and alloy steel (which shoulld be heat-treated) is not the only reason for preferring these metals. High temperatures go along with high steam pressure. For example with a pressure of 1000 lbs. of steam, the corresponding temperature would be approximately 550° F. This would not in itself draw the temper of other steels, but with the superheat which may be applied it is desirable to use steels which will stand a high temperature without losing their temper. Long subjection to high temperature will draw the temper at a temperature considerably below that which the metal is supposed to stand. Here the conditions of use under compressive and binding strains makes a safety factor particularly desirable.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. A member having an opening and a plain face about the opening in combination with a flanged insert for the opening, annular sealing teeth upon the side of the flange toward the plain face and means for tightly pressing the teeth against the face.

2. An annular member having an opening and a plain face about the opening in combination with a flanged insert for the opening, means for tightly drawing the flange against the plain face and concentric annular teeth of different diameters upon the flange engaging the plain face and all sloping away from their contacts in the same general direction so as to concentrate pressure against the teeth.

3. A member having a threaded opening in combination with a flanged sleeve threaded into the opening and having concentric annular teeth of different diameters engaging the face of the member about the opening, the faces of the teeth being substantially complementary to the face of the member.

4. A member having a threaded opening in combination with a flanged sleeve threaded into the opening and having concentric annular undercut teeth of different diameters engaging the face of the member about the opening, the faces of the teeth being substantially complementary to the face of the member.

5. A valve body having a diaphragm containing a threaded opening and having a plain face about the opening in combination with a valve seat threaded into the opening, having a flange and annular teeth upon the flange on the side toward the plain face, abrupt at the edges toward the pressure and having very narrow engagement with the plain face at these edges.

6. A valve body having a diaphragm containing a threaded opening and having a plain face about the opening in combination with a valve seat threaded into the opening, having a flange and annular teeth upon the flange on the side toward the plain face, undercut at the edges toward the pressure and having very narrow engagement with the plain face at these edges.

7. In a valve, a valve diaphragm having an opening and a plain face about the opening in combination with a flanged sleeve threaded into the diaphragm opening and concentric teeth on the flange engaging the plain face at one edge of each only and relieved adjacent that edge to concentrate pressure there.

8. A valve seat comprising a cylindrical threaded retaining member and a flange integral with the retaining member and having annular sealing teeth of different diameters upon the side toward the thread.

9. A diaphragm having a threaded opening, in combination with a sleeve within said opening threaded into the thread of the opening and a flange upon the sleeve having undercut coaxial annular spring contacts, one within another, engaging the surface of the diaphragm.

10. A valve having an annular seat, in combination with a valve closure therefor movable axially of the seat, having concentric annular spring contacts thereon of different diameters, one within another adapted to engage the seat.

11. A valve having an annular seat in combination with a valve closure therefor adapted to be moved axially of the seat and having upon its face a plurality of concentric annular spring contacts of different diameters for engaging the seat, undercut and relieved from contact with the seat except closely adjacent the undercut edges.

12. A metal wall having an opening, in combination with an insert for the opening with an inwardly undercut spring contact ring carried by the insert and adapted to engage with the facing surface of the wall.

13. A valve having an annular seat and a valve closure adapted to be moved axially of the seat and having upon its face an annular undercut spring contact having the undercutting about the outside of the contact.

14. A metal wall having an opening and an insert for the opening having a spring contact ring concentric with the opening and adapted to engage the facing surface of the wall.

WILLIAM F. OBERHUBER.